Feb. 19, 1946. W. P. CLARKSON 2,394,983
DUAL PURPOSE SCALE ASSEMBLY
Filed Oct. 17, 1944
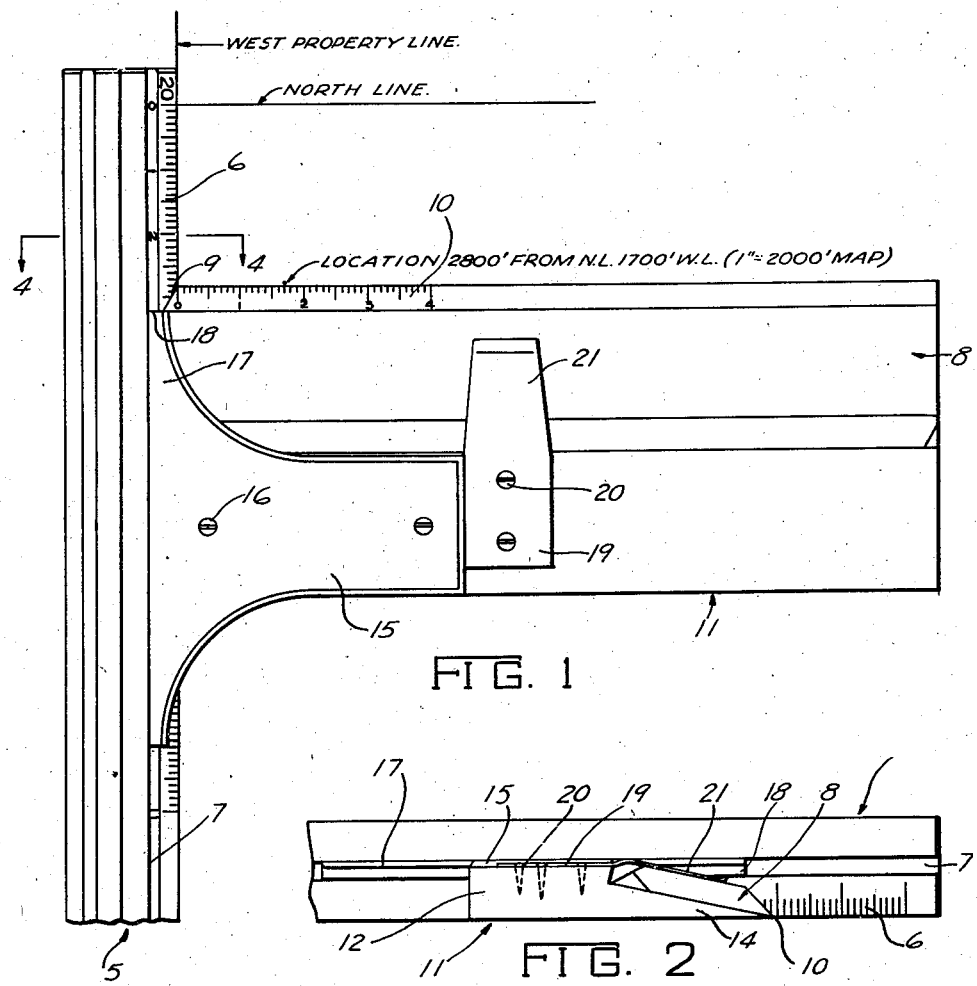
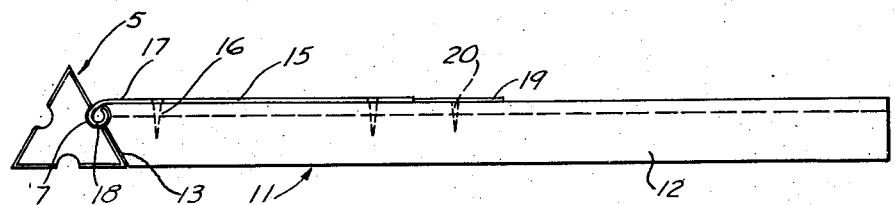
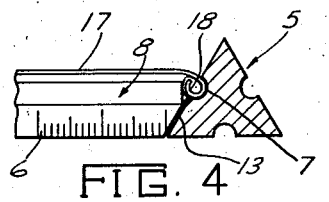
Inventor
William P. Clarkson
By Clarence A. O'Brien
and Harvey B. Jackson
Attorneys Patented Feb. 19, 1946

2,394,983

UNITED STATES PATENT OFFICE 2,394,983

DUAL-PURPOSE SCALE ASSEMBLY

William P. Clarkson, Corpus Christi, Tex., assignor of fifty per cent to T. Buford Nicholson, Corpus Christi, Tex.

Application October 17, 1944, Serial No. 559,041

4 Claims. (Cl. 33—103)

This invention relates to novel and improved means for conveniently assembling and holding a pair of companion scales or ruler-equipped scales, whereby to provide an easier, faster and more accurate way to spot locations in the performance of varied measuring and marking jobs.

The invention is to be known as a dual-purpose scale holder or scale assemblage and has to do with reliable and practicable means for holding the two scales at right angles to each other and shifting same to different predetermined relationships to enable the user to achieve desired aims with expediency and accuracy.

More particularly, in carrying out the principles of the invention, I use a regular triangular scale and a flat-type double beveled scale, one end of the latter abutting the coacting edge of the triangular scale, and there being special adapter means to support the flat scale in an inclined position and to slidably connect the mating end with the triangular scale.

Other features and advantages will become more readily apparent from the following description and the accompanying illustrative drawing.

In the drawing, wherein like numerals are employed to designate like parts throughout the views:

Figure 1 is a top plan view of the two scales in operative association with the adapter means holding and maintaining same in their respective positions.

Figure 2 is a fragmentary end view, that is a view observing the assemblage in Figure 1 in a direction from right to left.

Figure 3 is a side or edge elevational view of Figure 1.

Figure 4 is a section on the line 4—4 of Figure 1.

Referring now to the drawing by distinguishing reference numerals, it will be seen that the regular triangular scale-equipped ruler is denoted by the numeral 5 this being provided with a suitably graduated scale 6 and above said scale with the usual running groove or channel 7. I mention this part 7 because it constitutes a key-way for the adaptor means, as will be hereinafter described. The double bevel of the conventional flat ruler or scale is indicated at 8 and, in accordance with this invention one end is mitered and thus suitably beveled as at 9 to conformably contact the scale 6, this to associate the scale 6 with the scale 10 on said ruler 8.

The adapter for associating and adjustably utilizing the two scales or rulers together is denoted generally by the numeral 11. This comprises an elongated base 12 of suitable material and dimensions, the same being generally rectangular in cross-sectional form and having its inner end beveled as at 13 (see Figure 3) to slidably contact the coacting bevel on the main scale 5. As shown in Figure 2, one longitudinal edge of this base is rabbeted and the bottom of the rabbet is inclined outwardly and downwardly to form an inclined ledge 14 which constitutes a seat for accommodating and properly disposing the scale 8 in relation to the scale 5. A substantially T-shaped fixture is provided for assembling the parts. The shank 15 is superimposed on and fastened as at 16 to the inner end of the base 12. The flaring head portion 17 projects beyond the base and is fashioned into a longitudinal underlying curl 18 which is in effect a bead-like shoe, this sliding in the key-way formed by the groove 7. I also employ a clip 19 which is fastened as at 20 to the intermediate portion of the base strip 12 and has its free end bent downwardly and forming a retention finger 21 of appropriate resiliency. This bears upon and holds the ruler 8 on the ledge 14 as brought out in Figure 2 of the drawing. Thus, the adapter 11, as a unit, is temporarily coupled to the triangular scale or ruler 5 and has the ruler 8 spring-clipped thereon. Consequently, the two rulers are brought together in mating right angular relationship permitting the two scales 6 and 10 to be shifted and brought into varying relationships for multiple purpose calculation, describing, marking and other results attainable through the use of such an instrumentality.

It is thought that persons skilled in the art to which the invention relates will be able to obtain a clear understanding of the invention after considering the description in connection with the drawing. Therefore, a more lengthy description is regarded as unnecessary.

Minor changes in the shape, size and arrangement of details coming within the field of invention claimed may be resorted to in actual practice, if desired.

I claim:

1. In a structural assemblage of the class described, a base forming an adapter having an elongated shoe at one end for slidable coaction with an existing groove in a stock triangular scale, said base being provided along one side with an outwardly and downwardly inclined ledge, the latter being adapted to accommodate a conventional flat scale, and a spring-clip on said base adapted to overlie and to hold the second scale on the ledge.

2. An adapter for use and association with scales of the class described comprising an elongated base, a T-shaped fixture having its shank portion secured to the top of the base and its head portion projecting beyond the base and fashioned into a longitudinally extending bead, said bead constituting an assembling and shifting shoe, said base being provided along one side with an inclined portion constituting a ruler-seating ledge, and a spring-clip on said base overlying the ledge.

3. An adapter for use in association with two coacting scales of the class described comprising a horizontally elongated base having an elongated shoe at one end thereof for quick separable sliding coaction with an existing groove in a conventional triangular scale, said base being provided along one side with an outwardly and downwardly inclined ledge, the latter being adapted to accommodate a conventional flat scale, and means on said base to yieldably overlie and removably hold said second scale on said ledge.

4. An adapter for use in association with scales of the class described comprising an elongated base, a T-shaped fixture having a shank portion secured to the top of the base and a head portion projecting beyond the base, said head portion being fashioned into a longitudinally extending bead, said bead constituting an assembling and shifting shoe for coaction with an existing groove in a conventional triangular scale, said base being provided along one side with a portion constituting a ruler-seating ledge, and resilient means on said base overlying said ledge and adapted to hold said ruler removably in place on the ledge.

WILLIAM P. CLARKSON.